(12) United States Patent
Koponen et al.

(10) Patent No.: US 8,364,624 B2
(45) Date of Patent: Jan. 29, 2013

(54) METHOD AND ARRANGEMENT FOR CONTENT PRIORITIZATION

(75) Inventors: Petteri Koponen, London (GB); Jyri Engestrom, San Francisco, CA (US)

(73) Assignee: Google Inc., Mountain View, CA (US)

( * ) Notice: Subject to any disclaimer, the term of this patent is extended or adjusted under 35 U.S.C. 154(b) by 851 days.

(21) Appl. No.: 12/028,066

(22) Filed: Feb. 8, 2008

(65) Prior Publication Data

US 2008/0201289 A1 Aug. 21, 2008

(30) Foreign Application Priority Data

Feb. 9, 2007 (FI) .................... 20070119

(51) Int. Cl.
*G06F 17/00* (2006.01)
*G06F 15/173* (2006.01)
*G06N 5/02* (2006.01)

(52) U.S. Cl. ........................ 706/47; 709/240
(58) Field of Classification Search ............ 709/240
See application file for complete search history.

(56) References Cited

U.S. PATENT DOCUMENTS

| | | | | |
|---|---|---|---|---|
| 6,363,415 | B1 * | 3/2002 | Finney et al. | 709/206 |
| 7,116,766 | B2 * | 10/2006 | Owens et al. | 379/93.24 |
| 7,480,696 | B2 * | 1/2009 | Kirkland et al. | 709/207 |
| 7,587,461 | B2 * | 9/2009 | Baluja et al. | 709/207 |
| 7,860,933 | B2 * | 12/2010 | Kussmaul et al. | 709/206 |
| 2003/0131057 | A1 * | 7/2003 | Basson et al. | 709/206 |
| 2003/0131064 | A1 * | 7/2003 | Bell et al. | 709/206 |
| 2005/0204009 | A1 * | 9/2005 | Hazarika et al. | 709/206 |
| 2006/0010217 | A1 | 1/2006 | Sood | |
| 2006/0240856 | A1 | 10/2006 | Counts et al. | |
| 2006/0277467 | A1 | 12/2006 | Reponen et al. | |
| 2007/0005750 | A1 | 1/2007 | Lunt et al. | |

(Continued)

FOREIGN PATENT DOCUMENTS

| WO | WO 2006/115524 A2 | 11/2006 |
|---|---|---|
| WO | WO 2006/116020 A2 | 11/2006 |

(Continued)

OTHER PUBLICATIONS

Bardram et al. "The AWARE Architecture: Supporting Context-Mediated Social Awareness in Mobile Cooperation," CSCW03, New York 2003, ACM Press, 10 pages.

(Continued)

*Primary Examiner* — Jeffrey A Gaffin
*Assistant Examiner* — Stanley K Hill
(74) *Attorney, Agent, or Firm* — Fish & Richardson P.C.

(57) ABSTRACT

The invention concerns a method for determining priority of a data item, the data item being sent from at least one first terminal or service associable with the first terminal to a second terminal and evaluated using a set of first rules associable with the sender of a data item and a set of second rules associable with the recipient of a data item. The invention is characterized in that the data item is associated with at least one tag characterizing the data item, weight factor for the data item is maintained using the set of first rules and the value of the at least one tag, the weight factor of the data item is made adjustable by the set of second rules and the data item is rendered on the second terminal using at least the weight factor information. Also an arrangement implementing the method is disclosed.

18 Claims, 4 Drawing Sheets

U.S. PATENT DOCUMENTS

2007/0022157 A1     1/2007    Daniels et al.
2008/0140445 A1*   6/2008    Wang ................................ 705/2

FOREIGN PATENT DOCUMENTS

WO     WO 2006/133345 A2    12/2006
WO     WO 2006/135798 A2    12/2006

OTHER PUBLICATIONS

Davis et al., "MMM2: Mobile Media Metadata for Media Sharing," CHI 2005, Apr. 2-7, 2005, Portland, ACM Press, 4 pages.
Examination Report issued in Finland Patent Application No. 20070119, dated Oct. 29, 2007, 10 pages (relevant portions translated).

* cited by examiner

METHOD AND ARRANGEMENT FOR CONTENT PRIORITIZATION

TECHNICAL FIELD OF INVENTION

The invention relates to a method and arrangement for prioritizing content data in a messaging system, e.g. a mobile social network.

BACKGROUND OF THE INVENTION

Instant messaging systems and social networks enabled by Internet technologies are well known in prior art. They allow individuals to form groups and share information within the group.

US patent application 20070005750 teaches a system and method for managing connections in an online social network. An online social network of the disclosure collects descriptive data about various individuals and allows those individuals to indicate other individuals with whom they have a personal relationship.

PCT publication WO06135798 discloses a method and system for personal notification and broadcasting. It teaches a solution for contacting a plurality of contacts in emergency and non-emergency contexts. The system receives a call from a caller attempting to reach the plurality of contacts. The system compares an identifier associated with the caller to identifiers stored in a database to authenticate identity of the caller. Responsive to a positive authentication of the identity of the caller, the system identifies which contacts on a contact list to be reached based on information provided by the caller.

PCT publication WO06116020 discloses a presence monitoring method and system in a serverless peer-to-peer system. The system of the disclosure may transmit to other computing systems associated with other entities information regarding presence information associated with a user entity. The system may request of other computing systems associated with other entities information regarding presence information associated with the other entities. Presence information of the disclosure may generally indicate the willingness and/or ability of an entity to communicate and/or collaborate with other entities, for example.

PCT publication WO06115524 teaches a computer implemented method and system for enabling users to create a social network providing access to other users. By providing access to such networks via a visual presentation, the system renders content available for access by other network members. Access is sometimes provided through propagation of metadata or other uniquely identifying indicia associated with the social network to all or at least certain other network members.

U.S. patent application US20060240856 discloses a system and method that facilitates group-based mobile communication around external feed content is provided. The system and method involve adding external feed content to content generated within a group. According to the disclosure, both types of content can be viewed on the mobile devices of the group. Updates to the feed content can be obtained and communicated to the group. When multiple feeds are subscribed to by a group, one or more group members can display such feed content in a selective manner. Group members can also employ display filters to restrict feed content displayed on their mobile devices. Users can also search for available feeds and form new groups around such content or join an existing group.

U.S. patent application US20060277467 provides a method, a computer program product and device for generating a dream-like multimedia presentation, which can be displayed on a mobile terminal, or other digital device, based at least in part on contextual information relating to the mobile terminal and the mobile terminal user. The presentation provides the user with a snapshot of information that appears to be more important to the user at a given period of time, as well as information that may have been forgotten by the user over time, and does so in a manner that is somehow reflective of the user's presumed mood.

PCT publication WO06133345 discloses a system and method for providing non-requested content to a mobile terminal based on characteristics of, and tracked usage of the mobile terminal to request content through an online portal service, which provides access to content in multiple subject areas.

Social networks may also be mobile, i.e. their data and services may be made accessible through mobile terminals, e.g. cell phones, and other terminals that have more limited user interface resources and usability than e.g. desktop computers. The limited interface resources, such as small screen size, and limited usability make the use of social networks different. In desktop terminals it is feasible to browse through large volumes of data and use e.g. search functionality to find relevant data. On the other hand, in mobile terminals the amount of data brought to the terminal is critical. Also using search features that are commonplace in desktop environments is not usually feasible in the mobile terminal as the keyboard and pointing devices of the mobile terminal are less user-friendly than their desktop counterparties. For these reasons, only data that is relevant to the user should be provided in the user interface of the terminal and even the relevant data should be ordered according to the estimated importance of the data. A method and system for determining the order of relevance of data of a messaging system such as a mobile social network is therefore needed.

OBJECT OF THE INVENTION

The object of the present invention is to provide a method and arrangement for prioritizing rendering of content data in a messaging system, e.g. a mobile social network.

SUMMARY OF THE INVENTION

The invention discloses a method and arrangement for prioritizing content in a terminal device.

Content prioritization may be used for example for providing an improved user experience. A significant part of the user experience is to access primarily information that is most relevant to the user in the limited-size display of a terminal device, e.g. a mobile phone.

In the invention, at least one data item is sent from a device or system associable with a user (sender) to a device or system associable with another user (recipient). A data item may be for example a text string, an icon, a still picture or an audio or video stream or any combination of these. The data item may be created by the sender of the message or the sender may choose the data item from a set of pre-defined items. For example, pre-defined icons may be used for characterizing the current mood of the subscriber. Each of the data items may be characterized e.g. by attaching one or multiple tags to the data item. The data characterizing tags may be for example metadata items.

The sender or a system associable with the sender creates a content data item (e.g. message), tags it with one or multiple metadata tags and optionally chooses a "channel" through which the item is sent to one or multiple recipients. The tags generally characterize the data item. For example, a tag may indicate the sender or recipient of the data item, priority, topic or data type of the data item or any other property relevant to the data item. Tag data may be included in the data item or it may be a separate meta data item that is associated with the data item. A channel identifies the recipient or group of recipients to whom the data item is to be sent, for example. A channel may be specified e.g. using tags and the individual recipients of the message (i.e. subscribers of a channel) may be determined using rules associable to sender or recipient. A channel may require a subscription from the recipient or the channel may be a broadcast channel, for example. The subscribers may be granted receive and/or send access to the channel. Send access may allow subscriber to send messages to all subscribers of the channel whereas receive access allows only receiving of messages. If channel is not selected, a default channel for a new data item may be used.

The data item value, the selected content channel and/or the item tags may affect the potential importance of the data item. The importance of the data item and possibly other properties related to the data item may be determined by combined effect of two or more sets of rules that determine a weight factor for the data item. One set of rules may be associable with the sender of a data item and another set of rules may be associable with an intended recipient of a data item, for example. The purpose of the weight factor is to provide basis for comparing a plurality of content data items and determining the degree of significance (e.g. sort order) of each of the data items, for example. The weight factor may also comprise other information usable in rendering the content of the data item. The weight factor may be of a simple data type such as integer or floating point number or it may have a more complex data structure comprising e.g. instructions for rendering the data item in the recipient's terminal.

Once the content data item is processed by rules related to the sender end of the system, the data item along with the tag data is sent to at least one recipient. Each of the recipients may have their own receiving rules that may affect the weight factor of the received data item based on the value of the data item and/or tags associated with the data item. Thus, the overall importance of the data item for the user is the resulting weight factor determined by sender's rules and recipient's rules.

Before the content data items received by the recipient are rendered (e.g. a text string or picture is shown or a voice stream is played back) on the recipient's terminal device, e.g. a cellular phone, the data items are prioritized based on the weight factors and the prioritization is taken into account when determining, in which order and/or how data items should be rendered in the terminal. For example, the more important the data item is according to the weight factor, the more probably it will show on the screen of the recipient's terminal.

Content data items may be tagged both manually and automatically. For example, the location of sender may be added to the data item automatically based on the location information that is automatically available to the sender's terminal. If the sender and recipient are in the same location, the weight factor of the data item may be reduced significantly by the rules of the recipient or sender, for example.

The rules may be added to (and removed from) the system dynamically. For example, if a recipient doesn't want to receive messages from a specific user, the recipient may add a rule that reduces significantly the importance of the messages coming from that user. The rules may be defined in a terminal device which is a sender and/or receiver of the messages or the rules may be defined remotely using a web application, for example. The rules may be stored and executed in a terminal device or in a server computer or both.

The invention may also have a functionality to send feedback data from the receiver to the sender. The feedback may be user-created or it may be automatically generated by the system. The sender may for example be informed about the results of the prioritization of the data item in the terminals of different recipients. For example, the sender may be informed how often his/her messages end up in the group of displayed messages in recipients' terminals. If the messages of the sender constantly receive low prioritization, this may act as a hint to the sender to change his/her way of producing the data items (messages).

The display of the terminal device may be divided into multiple areas. Different areas may contain data from different channels. For example, at some time, three rows of six available ones may be dedicated to "job colleagues" channel, two rows may be for "chat with buddies" and one row may be for advertisements. In other words, there would always be three work-related messages, two chat messages and one advertisement on the screen of the mobile terminal. The data items may also be displayed for example in a chronological order of arrival. The display time and other parameters related to the rendering of the data item may vary according to the priority information of the data item.

The tags (e.g. meta-data items or properties) associated with a data item may also comprise cost information. For example, sending a SMS message to a subscriber's terminal may cost some money. A subscriber may have e.g. a pre-paid account related to the service that is debited whenever a text message is sent to him/her. Prior to sending a message, a rule associated with the recipient may check if the subscriber has sufficient balance in the account for the message to be sent. If sufficient balance exists, the system debits the account by the cost amount of the message. The user may credit the account by money payments or by accepting and viewing messages from sponsor members of the system, for example. For this purpose, the messages of e.g. sponsors of the system may have a "negative cost" price tag associated with the message (data item). A viewed sponsor message may thus increase the account balance of the subscriber.

Invention concerns a method for determining priority of a data item, the data item being sent from at least one first terminal or service associable with the first terminal to a second terminal and evaluated using a set of first rules associable with the sender of a data item and a set of second rules associable with the recipient of a data item. The invention is characterized in that the data item is associated with at least one tag characterizing the data item, weight factor for the data item is maintained using the set of first rules and the value of the at least one tag, the weight factor of the data item is made adjustable by the set of second rules and the data item is rendered on the second terminal utilizing the weight factor information.

The method may further be characterized in that said tag is used by said set of first rules for determining at least one recipient for the data item.

The method may still further be characterized in that information about said adjustment of said weight factor is transmitted back to said first terminal.

The method may yet further be characterized in that said prioritization is used at least partially for determining the display order of plurality of said data items in said second terminal.

The method may yet further be characterized in that said data item is associated with information related to cost related to said data item.

The method may still yet be characterized in that said data item is forwarded further from said second terminal to at least one third terminal, the third terminal associable with its own set of second rules for further adjusting the weight factor of the data item.

The invention may also comprise an arrangement that implements the method disclosed herein.

The best mode of the invention presently contemplated by the inventor applies the disclosure set forth herein to the prioritization of data in a messaging system, e.g. in a mobile social network.

Some embodiments of the invention are described herein, and further applications and adaptations of the invention will be apparent to those of ordinary skill in the art.

BRIEF DESCRIPTION OF DRAWINGS

In the following, the invention is described in greater detail with reference to the accompanying drawings in which.

DETAILED DESCRIPTION OF THE DRAWINGS

Figure 1:
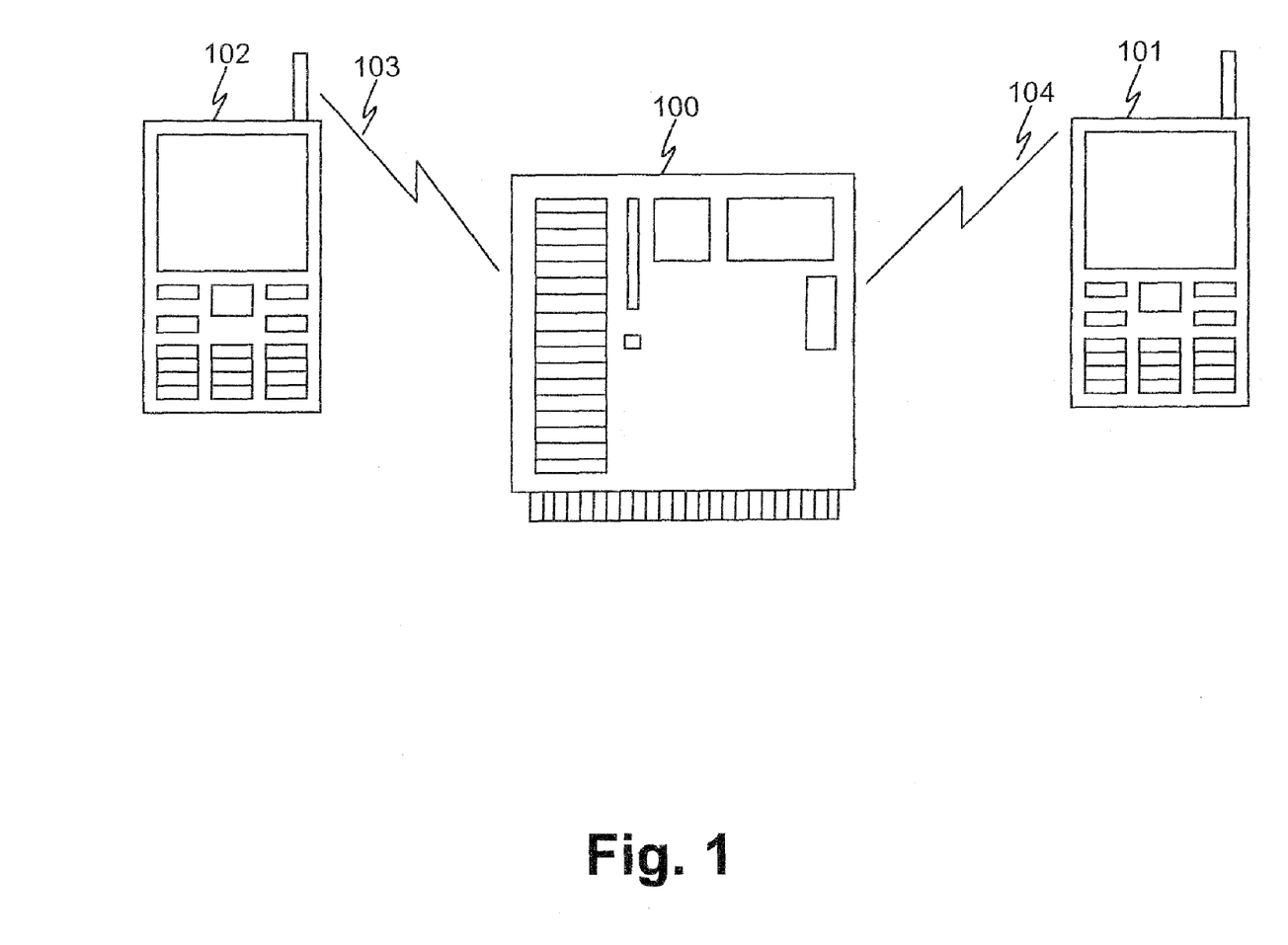
FIG. 1 shows an exemplary arrangement of servers and terminal devices according to an embodiment of the invention.

FIG. 1 illustrates an exemplary arrangement of server and terminal devices for implementing an embodiment of the method and system of the present invention. The arrangement comprises at least one server computer 100 which is connected to a communication network 103, 104, that at least partially may be a wireless network, for example WLAN, GSM, 3G or CDMA. Instead of a single server computer 100 the system may comprise any number of server computers that are arranged to have data communication means between them. The arrangement also comprises a plurality of terminal devices 101, 102. The terminal devices may be for example internet-capable cellular phones, PCs, PDAs or multimedia set-top boxes. The terminal devices are connected to the servers 100 using a communication network 103, 104. The terminal devices are arranged to send data items to the server(s) 100 and to receive data items from the server(s). The data items may be created in the terminal or they may be created by a service that is associable with a terminal and that is running on a server 100 of the system. Such service may be for example a location-tracking service that determines the current location of a cellular phone. The service may further be a presence service that determines whether a user of the terminal is available for communication or not. The data item created may be provided with at least one property (e.g. meta-data and/or tags) describing the data item. The property may be related for example to the sender or recipient of the data item, priority, topic or data type of the data item or any other property relevant to the data item, e.g. the text value of a text message, location of the terminal, availability of the user of the terminal or intended recipient(s) or "channel" of the data item.

A server 100 of the arrangement receives the data item and processes the data item with a set of rules. The rules determine on the basis of the properties (e.g. tags) of the data item the importance of the data item to the recipient(s) of the data item. Some of the rules being used in the priority determination process (described in more detail in FIGS. 3a and 3b) are associable with the sender of the data item and some of the rules are associable with the recipient of the data item.

Figure 2:
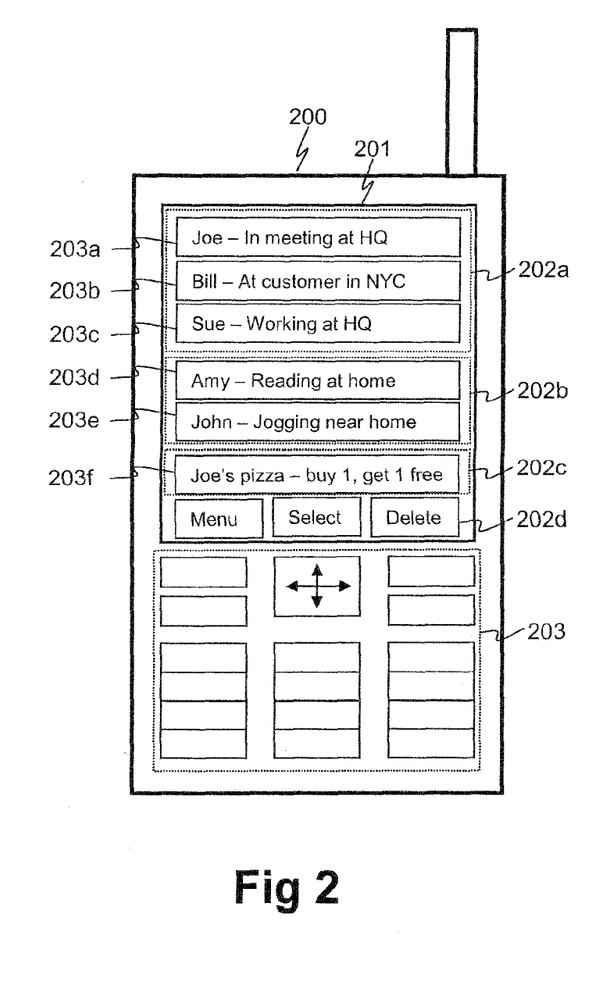
FIG. 2 shows an exemplary user interface of a terminal device according to an embodiment of the invention and FIGS. 3a and 3b show flow charts about determining a priority of an data item according to an embodiment of the invention.

FIG. 2 shows an exemplary terminal device 200 that is arranged to receive and render data items from a server (100 in FIG. 1) of the system. The terminal device has a display device 201 on which data items may be rendered. The application rendering the data items may divide the screen area into different segments 202a-d. For example, three rows 203a-c may be allocated to channels dedicated for work-related messages 202a, two rows 203d-e for channels dedicated to personal messages 202b and one row 203f for channels providing commercial messages 202c. The terminal also comprises a keyboard 203 or other input device, e.g. a touch screen integrated in the display device that can be used for controlling the application. The control functions 202d may for example comprise creating a new data item (e.g. text message, picture, voice stream or video stream), deleting an incoming data item, downgrading importance of a data item (to make it and other similar data items e.g. disappear from the screen) or responding to a data item. A data item 203a-f rendered on the screen may comprise for example information about the sender, availability and location. A data item may further comprise content data. The content data may be e.g. free text, images (e.g. icons) or streaming data. The property data (e.g. meta-data, tags) associated with the data item may also affect the rendering of the data item.

Figure 3A:
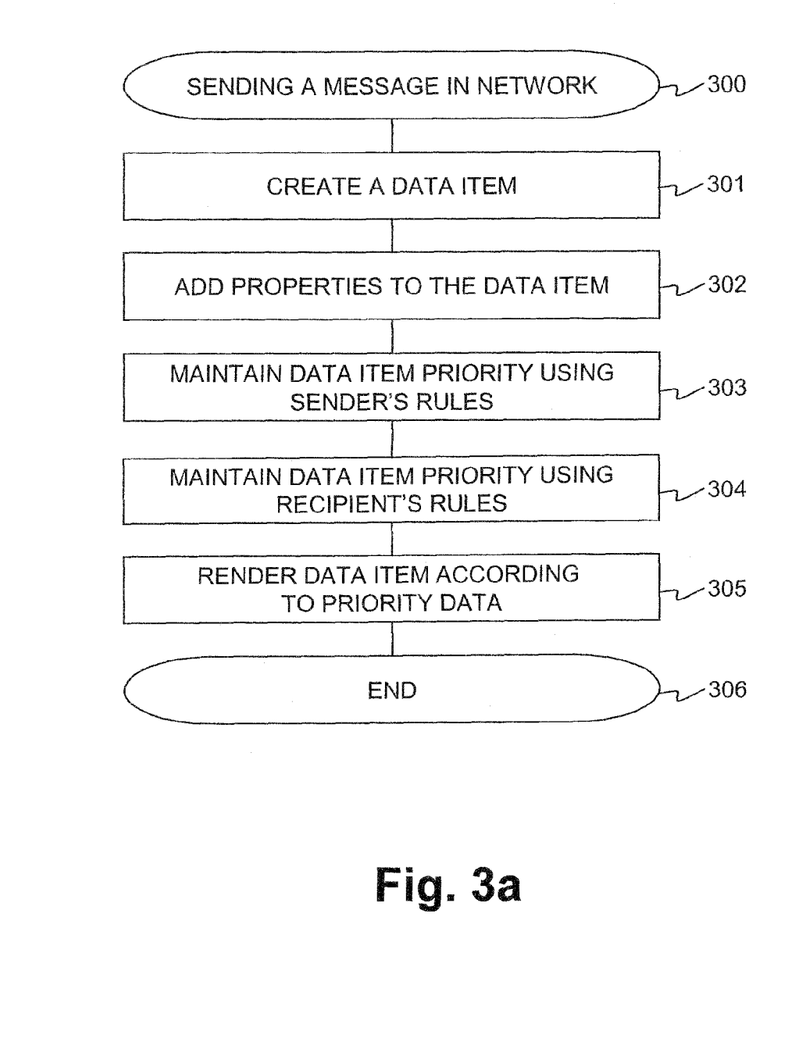

FIG. 3a shows a flow chart of an exemplary method about sending 300 a message (data item) in a network according to an embodiment of the present invention. First, a data item is created 301. This may be done for example in a terminal device (101, 102 in FIG. 1, 200 in FIG. 2) or using a service running on a server (e.g. 100 in FIG. 1) of the system. The data item is then amended with at least one property 302 that characterizes the data item. The properties (tags) may for example be meta-data items. The meta-data item may for example be a simple name-value pair of data associable with the content data item. Some property data values may also reside in the data item structure itself. The name-value pair may be for example such as "SENDER=JOE", "CHANNEL=COLLEAGUES", "IMPORTANCE=HIGH" or "MESSAGE_TYPE=LOCATION_UPDATE" or "CREATE_TIME=2007-02-02 15:35:00". In addition to a simple name-value pair, the meta-data may be of more complex type. After assigning properties to the data item, the properties are then used by rules that are associable with the sender of the data item. The rules maintain priority information (e.g. "weight factor") of the data item. The rules may also be used for determining the recipient(s) of the message. In one embodiment, creator of a channel may invite some of his/her contacts to subscribe to the channel. Those individuals who then subscribe to the channel, receive the content intended for that channel. For example, if the data item contains "CHANNEL=COLLEAGUES" tag, the data item is sent to all those subscribers who are subscribing to the "COLLEAGUES" channel of the sender. In some other embodiments, receiving content of a channel doesn't require separate subscription. The data item's priority information is further maintained using rules associable with the recipient 304. The rules may be used in one or multiple servers (100 in FIG. 1) and/or terminal devices (101, 102) of the system. Finally, data item is sent to the terminal device of the recipient and data item is rendered on the screen of the device at least partially according to the priority information of the data item. In some embodiments, data items may have multiple different prioritizations or other rendering instructions from which to choose. For example, users may want to view incoming messages ordered at least partially by arrival time of the message.

In this case, the message receiving time may be used at least partially as the basis of the message prioritization.

In some embodiments, rendering instructions of the data item may take into account the recipient(s) of the data item also with regards to what part of the content of the data item is being rendered. For example, a data item may be sent through multiple channels, e.g. "COLLEAGUES" and "BUDDIES". Rules associated with sender or recipient or some other means may be used for determining which part of the content of the data item is to be rendered on the recipient's terminal device. For example, a data item may contain two levels of information, e.g. "AT WORK" and "IN A MEETING WITH CUSTOMER N.N.". A rule may specify that those recipients that belong to the "COLLEAGUES" channel receive both levels of information whereas recipients belonging to "BUDDIES" channel receive only the "AT WORK" level of the information.

Figure 3B:
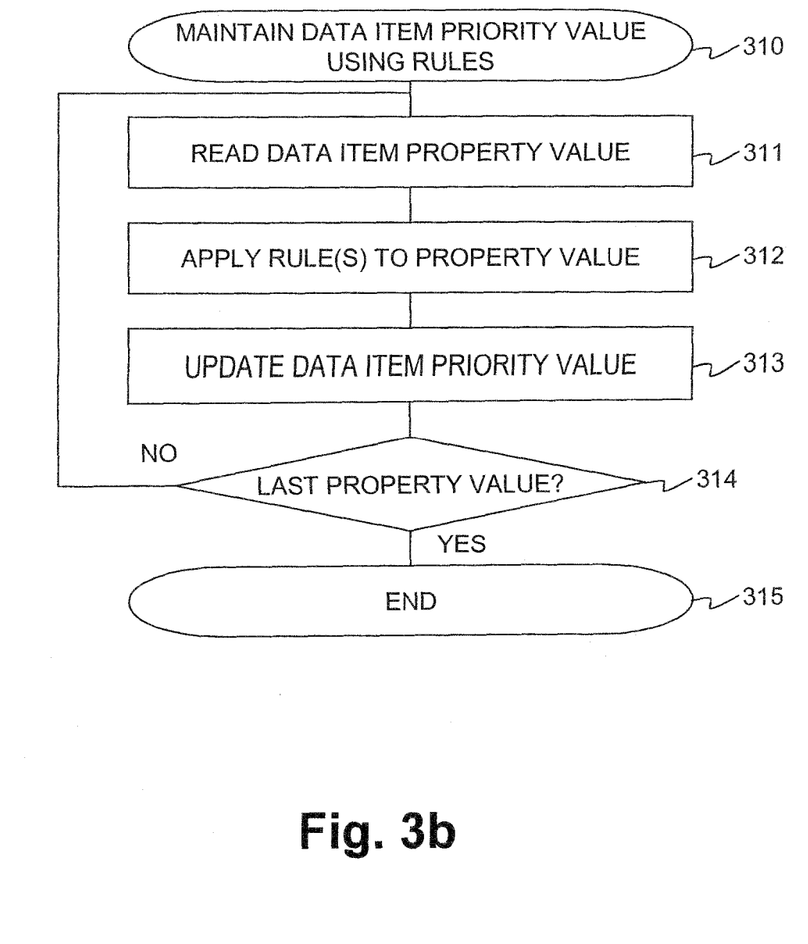

FIG. 3b shows in more detail an embodiment about the maintenance of data item priority information 310 (303, 304 in FIG. 3a). First, a property value (e.g. a meta-data item or a tag) of a data item is read 311. Then at least one rule regarding to the property value are applied 312 and priority value ("weight factor") of the data item is updated according to the instructions of the executed rule(s). If there are further property values 314 associated with the data item, they may be processed using steps 311-313. The priority value maintenance is completed 315 once all property values that may relevantly affect the item priority value have been processed.

The rules of an embodiment of the invention maintain information associated with the data item (message) to characterize for example the priority or importance of a data item. A pseudo code of a simple exemplary rule associable with a sender may for example look like following: "IF IMPORTANCE=HIGH THEN WEIGHT_FACTOR= WEIGHT_FACTOR+5". An exemplary pseudo code of a rule associable with a recipient may for example look like following: "IF SENDER=JOE THEN WEIGHT_FACTOR=WEIGHT_FACTOR+3". The recipient may also block a category of messages for example using rule such as "IF SENDER=JACK THEN WEIGHT_FACTOR=0". The overall importance of the message to recipient thus is in this example either 8 or 0, depending on who is sending the message. Consequently, Joe's message may be rendered immediately on the screen of the recipient's terminal whereas Jack's message may be completely ignored. The channel through which a message is received may also affect the importance of the message. For example, there may be rule such as "IF CHANNEL=JOES_BUDDIES THEN WEIGHT_FACTOR=WEIGHT_FACTOR+2" to increase importance of messages coming from any of Joe's buddies. Rules may also have precedences. For example, rule that sets weight factor to zero if the sender is Jack, may have precedence over the above mentioned "CHANNEL=JOES_BUDDIES" rule. Thus, all messages from Jack are ignored by the recipient, regardless of the channel through which they come from.

The steps of the methods illustrated in FIGS. 3a and 3b may be performed also in some other order than the one shown in the figures.

To a person skilled in the art, the foregoing exemplary embodiments illustrate the model presented in this application whereby it is possible to design different methods and arrangements, which in obvious ways to the expert, utilize the inventive idea presented in this application.

We claim:

1. A computer-implemented method, comprising:

receiving at a server and from a terminal device associated with a sender a data item for transmission to a terminal device associated with a recipient;

associating the data item with one or more metadata tags that characterize the data item, identify a sender of the data item, and identify an intended recipient of the data item;

deriving, at the server, an initial weight factor for the data item using a set of first rules provided by the sender of the data item and respective values of the one or more metadata tags;

adjusting, at the server, the initial weight factor of the data item to obtain an adjusted weight factor using a set of second rules provided by the intended recipient of the data item and the respective values of the one or more metadata tags; and providing the data item, at least one of the one or more metadata tags and the adjusted weight factor to a receiving device associated with the intended recipient of the data item, where the data item is rendered according to an order based at least in part on the adjusted weight factor and in accordance with the at least one metadata tag.

2. A method according to claim 1, wherein the method further comprises transmitting information related to said adjusted weight factor back to a sending device associated with the sender of the data item.

3. A method according to claim 1, wherein the method further comprises forwarding said data item further from said receiving device to at least one second receiving device, the at least one second receiving device having its own set of said second rules for further adjusting the adjusted weight factor of said data item.

4. A method according to claim 1, wherein the method further comprises associating said data item with information related to cost related to said data item.

5. A system, comprising:

one or more processors; and memory having instructions stored thereon, the instructions, if executed by the one or more processors, cause the system to perform operations comprising:

receiving from a terminal device associated with a sender a data item for transmission to a terminal device associated with a recipient;

associating the data item with one or more metadata tags that characterize the data item, identify a sender of the data item, and identify an intended recipient of the data item;

deriving an initial weight factor for the data item using a set of first rules provided by the sender of the data item and respective values of the one or more metadata tags;

adjusting the initial weight factor of the data item to obtain an adjusted weight factor using a set of second rules provided by the intended recipient of the data item and the respective values of the one or more metadata tags; and providing the data item, at least one of the one or more metadata tags and the adjusted weight factor to a receiving device associated with the intended recipient of the data item, where the data item is rendered according to an order based at least in part on the adjusted weight factor and in accordance with the at least one metadata tag.

6. A system according to claim 5, wherein the operations further comprise transmitting information related to said adjusted weight factor back to a sending device associated with the sender of the data item.

7. A system according to claim 5, wherein the operations further comprise forwarding said data item further from said receiving device to at least one second receiving device, the second receiving device having its own set of said second rules for further adjusting the adjusted weight factor of said data item.

8. A system according to claim 5, wherein the arrangement further comprises means for associating said data item with information related to cost related to said data item.

9. A method of claim 1, wherein the data item contains two levels of information, each level of information for display to users associated with a respective recipient type.

10. A method of claim 9, wherein providing the data item to the receiving device associated with the intended recipient of the data item further comprises:
providing one of the two levels of information to the receiving device according to a respective recipient type associated with the intended recipient of the data item.

11. A system of claim 5, wherein the data item contains two levels of information, each level of information for display to users associated with a respective recipient type.

12. A system of claim 11, wherein providing the data item to the receiving device associated with the intended recipient of the data item further comprises:
providing one of the two levels of information to the receiving device according to a respective recipient type associated with the intended recipient of the data item.

13. A computer-program product having instructions stored thereon, the instructions, when executed by one or more processors, cause the processors to perform operations comprising:
receiving from a terminal device associated with a sender a data item for transmission to a terminal device associated with a recipient;
associating the data item with one or more metadata tags that characterize the data item, identify a sender of the data item, and identify an intended recipient of the data item;
deriving an initial weight factor for the data item using a set of first rules provided by the sender of the data item and respective values of the one or more metadata tags;
adjusting the initial weight factor of the data item to obtain an adjusted weight factor using a set of second rules provided by the intended recipient of the data item and the respective values of the one or more metadata tags; and
providing the data item, at least one of the one or more metadata tags and the adjusted weight factor to a receiving device associated with the intended recipient of the data item, where the data item is rendered according to an order based at least in part on the adjusted weight factor and in accordance with the at least one metadata tag.

14. A computer-program product according to claim 13, wherein the operations further comprise transmitting information related to said adjusted weight factor back to a sending device associated with the sender of the data item.

15. A computer-program product according to claim 13, wherein the operations further comprise forwarding said data item further from said receiving device to at least one second receiving device, the second receiving device having its own set of said second rules for further adjusting the adjusted weight factor of said data item.

16. A computer-program product according to claim 13, wherein the arrangement further comprises means for associating said data item with information related to cost related to said data item.

17. A computer-program product of claim 13, wherein the data item contains two levels of information, each level of information for display to users associated with a respective recipient type.

18. A computer program product of claim 17, wherein providing the data item to the receiving device associated with the intended recipient of the data item further comprises:
providing one of the two levels of information to the receiving device according to a respective recipient type associated with the intended recipient of the data item.

* * * * *

UNITED STATES PATENT AND TRADEMARK OFFICE
CERTIFICATE OF CORRECTION

PATENT NO. : 8,364,624 B2
APPLICATION NO. : 12/028066
DATED : January 29, 2013
INVENTOR(S) : Koponen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this
Eleventh Day of November, 2014

Michelle K. Lee
*Deputy Director of the United States Patent and Trademark Office*